United States Patent [19]
Kang

[11] Patent Number: 5,715,013
[45] Date of Patent: Feb. 3, 1998

[54] DOUBLE PICTURE PRODUCING APPARATUS FOR WIDE SCREEN TELEVISION

[75] Inventor: Kyung Jin Kang, Seoul, Rep. of Korea

[73] Assignee: LG Electronics Inc., Seoul, Rep. of Korea

[21] Appl. No.: 599,133

[22] Filed: Feb. 9, 1996

[51] Int. Cl.$^6$ ..................................................... H04N 5/45
[52] U.S. Cl. ........................ 348/564; 348/561; 348/588; 348/704
[58] Field of Search .................... 348/564, 568, 348/561, 581, 588, 704, 706, 556; H04N 5/44, 5/45, 5/445

[56] References Cited

U.S. PATENT DOCUMENTS

| | | | |
|---|---|---|---|
| 4,862,269 | 8/1989 | Sonoda et al. | 358/160 |
| 5,404,177 | 4/1995 | Imai et al. | 348/588 |
| 5,504,538 | 4/1996 | Abe | 348/565 |
| 5,576,769 | 11/1996 | Lendaro | 348/511 |

FOREIGN PATENT DOCUMENTS 6-62339  4/1994  Japan ................ H04N 5/45

Primary Examiner—Glenton B. Burgess
Attorney, Agent, or Firm—Birch, Stewart, Kolasch & Birch, LLP

[57] ABSTRACT

An improved double picture producing apparatus for a wide screen television capable of concurrently achieving an aspect ratio conversion and a double picture display using a picture zooming up function of an aspect ratio conversion, which includes a clock generating unit for receiving a horizontal synchronous signal and for outputting a writing clock signal, a reading clock signal, and a mode selection signal; a decimating unit for counting the writing clock signal outputted from the clock generating unit and for outputting a writing address and a reading address in accordance with a mode selection signal; a double picture video signal generating unit for receiving a first video signal and a second video signal which are aspect-ratio-converted by the first and second zooming units and for outputting a video signal of a double picture by dividing the number of scanning lines of the video signals in half; and a video signal selection unit for receiving first and second video signals aspect-ratio-converted by the first and second zooming units and a double picture video signal outputted from the double picture video signal generating unit, and for outputting the signals to a color picture tube in accordance with a mode selection signal.

9 Claims, 5 Drawing Sheets

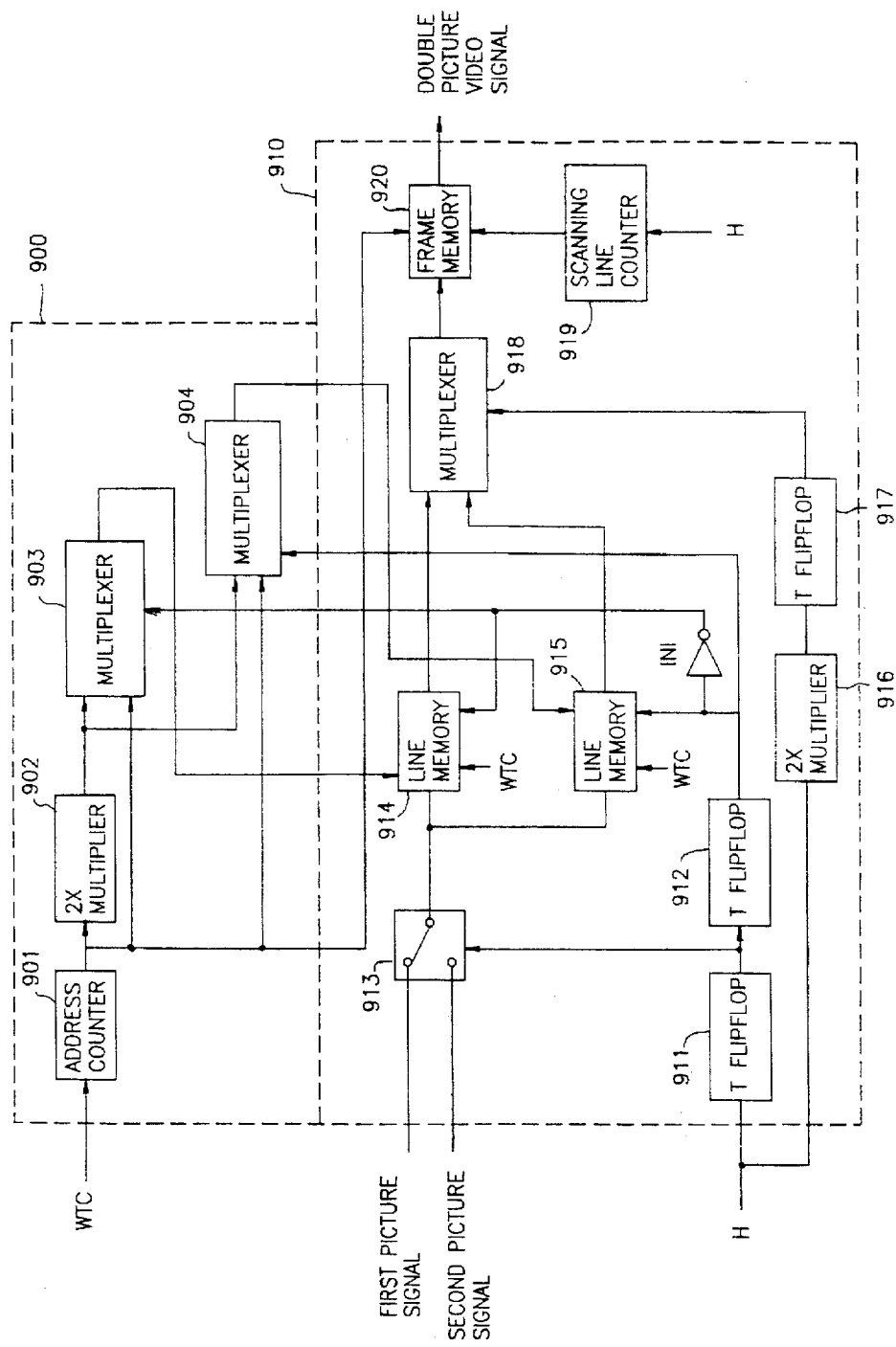

DOUBLE PICTURE PRODUCING APPARATUS FOR WIDE SCREEN TELEVISION

BACKGROUND OF THE INVENTION

1. Field of the Invention

The present invention relates to a double picture producing apparatus for a wide screen television, and in particular to an improved double picture producing apparatus for a wide screen television capable of concurrently achieving an aspect ratio conversion and a double picture display using a picture zooming up function of an aspect ratio conversion.

2. Description of the Conventional Art

As well known to those skilled in the art, a double picture television, as shown in FIG. 1, includes letter boxes, which are formed at the upper portion of the screen and the lower portion of the same, by which a 16:9 aspect ratio picture can be displayed in a 4:3 aspect ratio television without any distortion of picture.

In addition, in accordance with an increasing use of the wide screen television, a combined program of the 4:3 aspect ratio and the 16:9 aspect ratio has been provided by broadcasting stations, so that the 4:3 aspect ratio screen television and the 16:9 aspect ratio screen television can be concurrently used. A television program watcher having the 4:3 aspect ratio screen television or the 16:9 aspect ratio screen television can enjoy the 4:3 aspect ratio program on the 16:9 aspect ratio screen television.

FIG. 2 shows a double picture producing apparatus for a conventional wide screen television, which includes a left-side screen video signal processing unit 10 for receiving a left-side screen video signal, generating horizontal and vertical synchronous signals H and V and a dock signal, and separating a luminance signal and a chrominance signal from the lea-side screen video signal, a left-side screen chrominance signal selection unit 20 for reading/writing Red, Green, and Blue (RGB) signals outputted from the left-side screen video signal processing unit 10 in accordance with a horizontal synchronous signal H, a right-side screen video signal processing unit 30 for receiving a right-side screen video signal, generating horizontal and vertical synchronous signals H and V and a clock signal, separating a luminance signal and a chrominance signal from a right-side screen video signal, demodulating the signal, and outputting R, G, and B signals, a right-side screen chrominance signal selection unit 40 for reading/writing R, G, and B signals outputted from the right-side screen video signal processing unit 30 in accordance with a horizontal synchronous signal H, a deflection unit 50 for outputting a control signal to a color picture tube (CPT) so as to expand the size of a picture leftwardly and rightwardly in accordance with horizontal and vertical synchronous signals H and V outputted from the lea-side picture signal processing unit 10, a selection signal generating unit 60 for receiving a horizontal synchronous signal H and a clock signal outputted from the left-side picture signal processing unit 10 and for outputting a selection signal MSS so as to produce a double picture and a single picture in accordance with a mode selection signal MSS, a first multiplexer 70 for receiving the output of the left-side picture signal processing unit 10 and the right-side picture signal processing unit 30 and for producing a left-side picture and a double picture in accordance with a selection signal of the selection signal generating unit 60, an on-screen generating unit 80 for counting the horizontal synchronous signal outputted from the lea-side picture signal processing unit 10 and for outputting a letter signal and a letter output control signal, a second multiplexer 90 for receiving the outputs of the first multiplexer 70 and the on-screen generating unit 80 and for outputting a certain signal in accordance with a letter output control signal, and a D/A converter 100 for converting the output of the second multiplexer 90 into an analog signal in accordance with a selection signal of the selection signal generating unit 60 and for outputting to the color picture tube.

The left-side picture signal processing unit 10 includes an amplifier 11 for amplifying a left-side picture signal, a synchronous separating unit 12 for separating a horizontal synchronous signal H and a vertical synchronous signal V from the amplified left-side picture signal, a clock generating unit 13 for generating a clock signal in accordance with a synchronized output signal of the synchronous separating unit 12, an A/D converter 14 for converting the left-side picture signal into a digital picture signal in accordance with a clock signal, a band-pass amplifier 15 for amplifying the digitally converted left-side picture signal be a band-pass, a chrominance synchronous unit 16 for synchronizing the chrominance signal from the band-pass amplified left-side picture signal, a demodulating unit 17 for demodulating the output of the band-pass amplifier 15 and the output of the chrominance synchronous unit 16 and for outputting chrominance difference signals R-Y and B-Y, and a matrix unit 18 for receiving the chrominance difference signals R-Y and B-Y and a luminance signal Y outputted from the A/D converter 14 and for outputting R, G, and B signals.

The left-side picture chrominance signal selection unit 20 includes a switch 21 alternatingly switched in accordance with a cycle of the horizontal synchronous signal H for outputting R, G, and B signals outputted from the matrix unit 18, line memories 22 and 23 for reading/writing R, G, and B signals outputted from the switch 21, and a second switch 24 alternately switched in accordance with a cycle of the inverted horizontal synchronous signal H for outputting R, G, and B signals outputted from the line memories 22 and 23.

In addition, the construction of the right-side picture signal processing unit 30 and the right-side chrominance signal selection unit 40 are the same as the left-side picture signal processing unit 10 and the left-side chrominance signal selection unit 20.

The deflection unit 50 includes a vertical deflection unit 51 and a horizontal deflection unit 52 for outputting a vertical deflection signal and a horizontal deflection signal to a deflection coil of the CPT so as to expand the size of picture vertically and horizontally in accordance with vertical and horizontal synchronous signals V and H outputted from the synchronous separating unit 12, a convergence unit 53 for receiving a vertical deflection signal and a horizontal deflection signal and for outputting a deflection angle and a control signal to the convergence coil of the CPT, and a high voltage generating unit 54 for generating a high voltage of about 10 kV in accordance with a deflection signal outputted from the horizontal deflection unit 52 and for outputting to both poles of the CPT.

The selection signal generating unit 60 includes a 2× multiplier 61 for doubling the frequency of the horizontal synchronous signal H outputted from the synchronous separating unit 12, a dflipflop 62 for outputting a clock signal having a high level state and a low level state for one horizontal scanning period in accordance with an output of the 2× multiplier 61, a 2× multiplier 63 for doubling the frequency of the clock signal outputted from the clock generating unit 13, and switches 64 and 65 which are switched in accordance with a mode selection signal MSS set by a user.

The on-screen generating unit 80 includes a counter 81 for counting the horizontal synchronous signal H outputted from the synchronous separating unit 12 and for judging the position of letter, a letter generating unit 82 for outputting a letter signal in accordance with a count value outputted from the counter 81, a comparing unit 83 for receiving the count value of the counter 81 and for comparing the count value with a previously set reference count value, and a dflipflop 84 for outputting a selection signal in accordance with a comparison signal of the comparing unit 83.

The operation of the double picture producing apparatus for a conventional wide-screen television will now be explained with reference to the accompanying drawings.

To begin with, when a left-side picture signal and a right-side picture signal outputted from a broadcasting station are inputted to a double picture producing apparatus of a wide-screen television, the left-side picture signal and the right-side picture signal are processed by the left-side picture signal processing 10 and the right-side picture signal processing unit 20, respectively. In this regard, only the left-side picture signal processing will now be explained.

The left-side picture signal is amplified by the amplifier 11, digitally converted by the A/D converter 14, and amplified by the band-pass amplifier 15 by a band pass and inputted to the demodulating unit 17. Thereafter, the chrominance synchronous unit 16 synchronizes the chrominance signal from the left-side picture signals band-passed by the chrominance synchronous unit 16 and outputs to the demodulating unit 17.

Thereafter, the demodulating unit 17 demodulates the output of the band-pass amplifier 15 and the output of the chrominance synchronous unit 16 and outputs chrominance difference signals R-Y and B-Y, and the matrix unit 18 receives the chrominance difference signals R-Y and B-Y and a luminance signal Y outputted from the A/D converter 14 and outputs R, G, and B signals to the left-side picture chrominance signal selection unit 20.

In addition, the synchronous separating unit 12 receives the output of the amplifier 11 and separating a horizontal synchronous signal H and a vertical synchronous signal V therefrom, and the clock generating unit 13 outputs a clock signal in accordance with a synchronized output signal of the synchronous separating unit 12.

Thereafter, the switch 21 of the left-side chrominance signal selection unit 20 is alternately switched at every cycle of the horizontal synchronous signal H, and outputs R, G, and B signals outputted from the matrix unit 18, and the line memories 22 and 23 receive the R, G, and B signals from the first switch 21, and the writing and reading operations are repeatedly performed.

In addition, the second switch 21 is alternately switched at every cycle of the inverted horizontal synchronous signal H and outputs the R, G, and B signals read from the line memories 22 and 23 to the first multiplexer 70.

When the R, G, and B signals outputted from the matrix unit 18 are inputted to the line memory 22 through the switch 21, the line memory 22 becomes a writing state, and the line memory 23 becomes a reading state. When the R, G, and B signals read from the line memory 23 are outputted to the first multiplexer 70 through the switch 24, and when the R, G, and B signals outputted from the matrix unit 18 are inputted to the line memory 23 through the switch 21, the line memory 23 becomes a writing state, and the line memory 22 becomes a reading state. The R, G, and B signals read from the line memory 22 are outputted to the first multiplexer 70 through the switch 24.

In addition, the right-side picture signal processing unit 30 receives a right-side picture signal and outputs R, G, and B signals to the right-side chrominance signal selection unit 20 through the same process of the left-side picture signal processing unit 10, and the operation of the right-side picture chrominance signal selection unit 40 is performed in the same manner of the left-side picture chrominance signal selection unit 20.

That is, when the R, G, and B signals outputted from the matrix unit 38 are inputted to the line memory 42 through the switch 41, the line memory 42 becomes a writing state, and the line memory 43 becomes a reading state. When the R, G, and B signals outputted from the matrix unit 38 are inputted to the line memory 43 through the switch 41, the line memory 43 becomes a writing state, and the line memory 42 becomes a reading state. The R, G, and B signals are read and written through the switches 41 and 42 which are switched in accordance with a horizontal synchronous signal H and an inverted horizontal synchronous signals H.

Meanwhile, the 2× multiplier 61 of the selection signal generating unit 60 doubles the frequency of the horizontal synchronous signal H outputted from the synchronous unit 12, and the dflipflop 62 receives a horizontal synchronous signal whose frequency is doubled and outputs a clock signal, which has a high state and a low state for one cycle of a horizontal synchronous signal H, to the switch 64, and the 2× multiplier 63 doubles the frequency of the clock signal outputted from the clock generating unit 13 and outputs to the switch 65.

At this time, when a double picture selection signal MSS is inputted, a clock signal outputted from the dflipflop 62 is inputted as a selection signal of the first multiplexer 70 through the switch 64, and a clock signal outputted from the 2× multiplier 63 is inputted to the D/A converter 100.

Therefore, the first multiplexer 70 outputs R, G, and B signals outputted from the left-side picture chrominance signal selection unit 20 for a first half cycle of a clock signal in accordance with a clock signal in accordance with a clock signal inputted thereto through the switch 64, and outputs R, G, and B signals outputted from the right-side picture chrominance signal selection unit 40 for the next half cycle thereof, and the R, G, and B signals of a double picture are multiplied for one horizontal scanning period and outputted to the second multiplexer 90.

In addition, the counter 81 of the on-screen generating unit 80 counts the horizontal synchronous signal H inputted thereto through the synchronous separating unit 12, and the letter generating unit 82 outputs a letter signal to the second multiplexer 90 in accordance with a count value, and the comparing unit 83 receives a count value outputted from the counter 81 and compares the count value with a previously set reference value, and the dflipflop 84 outputs a selection signal to the second multiplexer 90 in accordance with a comparison signal inputted thereto from the comparing unit 83.

At this time, when there is a certain letter to be displayed on a screen, the second multiplexer 90 receives a letter signal from the letter generating unit 82 and outputs to the D/A converter 100 in accordance with a selection signal outputted from the dflipflop 84. When there is no any of letter, the second multiplexer 90 outputs R, G, and B signals of a double picture, outputted from the dflipflop 84 of the on-screen generating unit 60, to the D/A converter 100, and the D/A converter 100 converts a letter signal and R, G, and B signals of a double picture outputted from the first multiplexer 70 into an analog signal at a 2× speed in accordance with a clock signal outputted from the switch 65 and outputs to the CPT.

In addition, when a vertical deflection signal and a horizontal deflection signal are inputted to the deflection coil of the CPT for expanding the size of picture vertically and horizontally from the vertical deflection unit 51 and the horizontal deflection unit 52 of the deflection unit 50, the convergence coil receives a deflection angle control signal applied thereto from the convergence unit 53, and beams corresponding to the R, G and B signals of a double picture applied thereto from the D/A converter 100 is controlled to be focused at a certain point, and the high voltage generating unit 54 outputs a high voltage of about 10 kV to both poles of the CPT.

Therefore, the CPT processes a letter signal outputted from the D/A converter 100 and R, G, and B signals of a double picture in accordance with a vertical deflection signal and a horizontal deflection signal outputted from the vertical deflection unit 51 and the horizontal deflection unit 52, respectively, and a deflection angle signal outputted from the convergence unit 53, so that a left-side picture signal and a right-side picture signal are displayed on a screen as a double picture.

Meanwhile, when a certain selection signal MSS is inputted, a ground voltage is inputted to the first multiplexer 70 as a selection signal through the switch 64 in accordance with a selection signal MSS, and the clock signal outputted from the clock generating unit 13 is inputted to the D/A converter 100 through the switch 65.

Thereafter, the first multiplexer 70 outputs R, G, and B signals, outputted from the left-side picture chrominance signal selection unit 20, to the second multiplexer 90 in accordance with a ground voltage, and the second multiplexer 90 receives a letter signal and a selection signal from the on-screen generating unit 80. When a certain letter signal exists, the second multiplexer 90 multiplies the R, G, and B signals and the letter signal in accordance with a selection signal and outputs to the D/A converter 100.

Therefore, the D/A converter 100 converts the multiplied R, G, and B signals into an analog signal in accordance with a clock signal inputted thereto from the switch 65 and outputs to the CPT, and the CPT displays a left-side picture and a right-side picture on the screen in accordance with a control signal outputted from the deflection unit 50.

However, the double picture producing apparatus for a conventional wide-screen television can not perform an aspect ratio conversion function because the size of each picture can not be vertically or horizontally expanded using deflection coil. In addition, the construction of the system is complex.

SUMMARY OF THE INVENTION

Accordingly, it is an object of the present invention to provide a double picture producing apparatus for a wide screen television, which overcome the problems encountered in a conventional double picture producing apparatus for a wide screen television.

It is another object of the present invention to provide an improved double picture producing apparatus for a wide screen television capable of concurrently achieving an aspect ratio conversion and a double picture display using a picture zooming up function of an aspect ratio conversion.

To achieve the above objects, there is provided a double picture producing apparatus for a wide screen television, which includes a fist zooming unit for line-delaying a first video signal, and for increasing the number of scanning lines through an operation, and for performing an aspect ratio conversion function; a second zooming unit for line-delaying a second video signal, and for increasing the number of scanning lines through an operation, and for performing an aspect ratio conversion function; a synchronous separating unit for receiving a first video signal, and for separating a horizontal synchronous signal and a vertical synchronous signal from the first video signal; a first field memory for receiving an output of second zooming unit having a converted aspect ratio and for synchronizing the output with a horizontal synchronous signal and a vertical synchronous signal; a clock generating unit for receiving a horizontal synchronous signal and for outputting a writing clock signal, a reading clock signal, and a mode selection signal; a decimating unit for counting the writing clock signal outputted from the clock generating unit and for outputting a writing address and a reading address in accordance with a mode selection signal; a double picture video signal generating unit for receiving a first video signal and a second video signal which are aspect-ratio-converted by the first and second zooming units and for outputting a video signal of a double picture by dividing the number of scanning lines of the video signals in half; and a video signal selection unit for receiving first and second video signals aspect-ratio-converted by the first and second zooming units and a double picture video signal outputted from the double picture video signal generating unit, and for outputting the signals to a color picture tube in accordance with a mode selection signal.

BRIEF DESCRIPTION OF THE DRAWINGS

FIG. 6 is a block diagram of a second embodiment of a decimating unit and a double picture signal generating unit of a double picture generating apparatus for a wide-screen television according to the present invention.

DETAILED DESCRIPTION OF THE INVENTION

Figure 3:
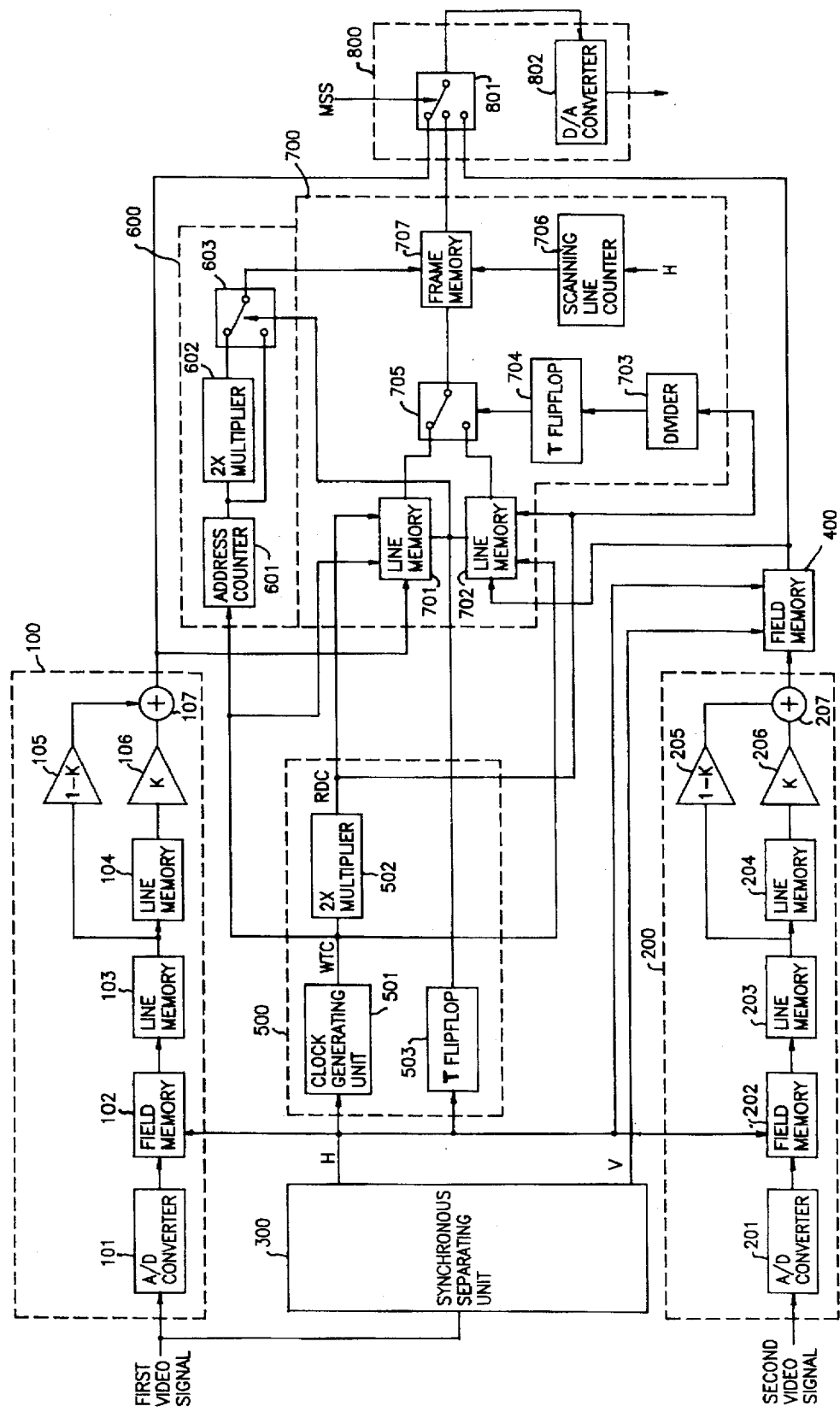
FIG. 3 is a block diagram of a first embodiment of a double picture producing apparatus for a wide screen television according to the present invention.

FIG. 3 shows a double picture producing apparatus for a wide screen television of a first embodiment according to the present invention, which includes a first zooming unit 100 for performing an aspect ratio conversion function by increasing the number of scanning lines in accordance with a line delay of a first video signal, a second zooming unit 200 for performing an aspect ratio conversion function by increasing the number of scanning lines in accordance with a line delay of a second video signal, a synchronous separating unit 300 for separating a horizontal synchronous signal H and a vertical synchronous signal V from a first video signal, a field memory 400 for receiving the output of the second zooming unit 200 and for synchronizing the output with a horizontal synchronous signal H and a vertical synchronous signal V, a clock generating unit 500 for receiving a horizontal synchronous signal H and for generating a writing clock signal WTC, a reading clock signal RDC, and a mode selection signal MSS, a decimating unit 600 for counting the writing clock signal WTC outputted from the clock generating unit 500 and for outputting a writing address and a reading address in accordance with a mode selection signal MSS, a double picture video signal generating unit 700 for receiving a first video signal and a second video signal which are aspect-ratio-converted by the first and second zooming units 100 and 200 and for outputting a video signal of a double picture by reducing the number of scanning lines by half the number thereof of the video signals, and a video signal selection unit 800 for receiving first and second video signals which are aspect-ratio-converted by the first and second zooming units 100 and 200 and a double picture video signal from the double picture video signal generating unit 800 and for outputting to the color picture tube (not shown) in accordance with a mode selection signal Mss.

The first zooming unit 100 includes an A/D converter 101 for converting a first video signal into a digital signal, a field memory 102 for outputting the output of the A/D converter 101 in accordance with a synchronized horizontal synchronous signal H, a line memory 103 for delaying the output of the field memory 102 by one line, a line memory 104 for delaying the one-line delayed first video signal by one line, a first operation unit and a second operation unit 106 for operating the output of the first and second line memories 103 and 104 and for varying the line value, and an adder 107 for adding the line values of the first operation unit 105 and the second operation unit 106 and for providing a new scanning line and for outputting an aspect-ratio converted first video signal.

In addition, the construction of the second zooming unit 200 is the same as the first zooming unit 100.

The clock generating unit 500 includes a clock generating unit 501 for outputting a writing clock signal WTC of 910$f_H$ in accordance with a synchronous signal H outputted from the synchronous unit 300, a 2× multiplier 502 for doubling the writing clock signal WTC of 910$f_H$ and for outputting a reading clock signal WTC of 1820$f_H$, and a tflipflop 503 for outputting a reading/writing mode signal in accordance with a horizontal synchronous signal H outputted from the synchronous separating unit 300.

The decimating unit 600 includes an address counter 601 for counting the writing clock signal WTC of 910$f_H$ outputted from the clock generating unit 501 and for outputting a writing address, a 2× multiplier 602 for doubling the writing address outputted from the address counter 601, and a switch 603 which is switched in accordance with a reading and writing mode signal outputted from the address counter 601 for selectively outputting a writing address outputted from the address counter 601 and a reading address outputted from the 2× multiplier 602.

The double picture video signal generating unit 700 includes line memories 701 and 702 for writing first and second video signals outputted from the first and second zooming units 100 and 200 as a writing clock signal WTC of 910$f_H$ in accordance with a reading/writing mode signal outputted from the tflipflop 503 and for reading odd number lines of the first and second video signals as a reading clock signal WTC of 1820$f_H$, a divider 703 for receiving the leading clock signal WTC of 1820$f_H$ from the 2× multiplier 502 and dividing it by 910$f_H$, a tflipflop 704 for outputting a high level clock signal and a low level clock signal for one horizontal scanning period in accordance with an output of the divider 703, a switch 705 which is alternately switched in accordance with a clock signal outputted from the tflipflop 704 and for outputting first and second video signals read from the line memories 701 and 702, a scanning line counter 706 for counting the horizontal synchronous signal H and for outputting a letter box control signal, and a frame memory 707 for storing a video signal outputted from the switch 705 as a double picture video signal in accordance with a writing address of the address counter 601 and for reading a video signal of the stored double picture in accordance with a letter box control signal outputted from the scanning line counter 706 and a reading address outputted from the 2× multiplier 602.

The video signal selection unit 800 includes a switch 801 for receiving first and second video signals outputted from the first and second zooming traits 100 and 200 and a double picture video signal outputted from the double picture video signal generating unit 700 and for outputting a certain signal in accordance with a mode selection signal MSS, and a D/A converter 802 for converting the video signal selected by the switch 801 into an analog signal.

The operation of a double picture producing apparatus for a wide-screen television according to the present invention will now be explained with reference to the accompanying drawings.

To begin with, a first video signal inputted to the first zooming unit 100 is converted into a digital signal by the A/D converter 101, and stored in the field memory 102, and the field memory 102 outputs a stored first video signal which is synchronized with a horizontal synchronous signal H, and the line memories 103 and 104 outputs the first video signal outputted from the field memory 102 by sequentially delaying it by one line.

Thereafter, the first operation unit 105 receives a first video signal one-line-delayed by the line memory 103 and changes the position of the line by multiplying the value by a coefficient value 1−K, and the second operation unit 106 receives a first video signal one-line-delayed by the line memory 104 and multiplies the value with a coefficient value K and changes the position of the line. Here, the coefficient value K varies in a range of 1, ¼, ½, ¾.

Therefore, the adder 107 generates a new scanning line from upper and lower horizontal scanning lines in accordance with an addition of the outputs of the first operation unit 105 and the second operation unit 106, and inserts the new scanning line between the first and third scanning lines of the original horizontal scanning line, thereby increasing the number of the horizontal scanning lines, so that an aspect ratio conversion function is performed.

Figure 1:
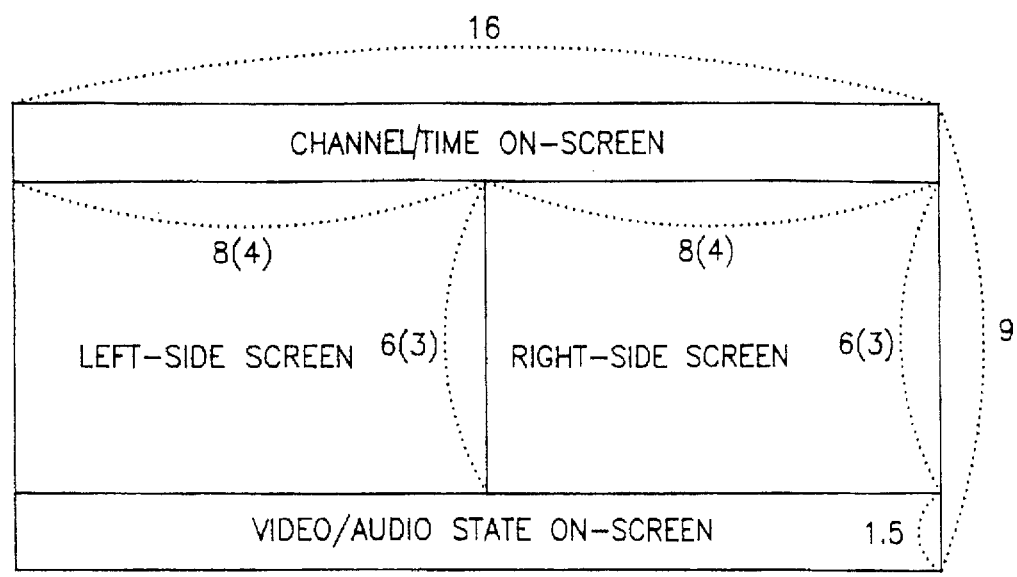
FIG. 1 is a schematic front view of a double picture screen of a conventional television.
Figures 4A, 4B:
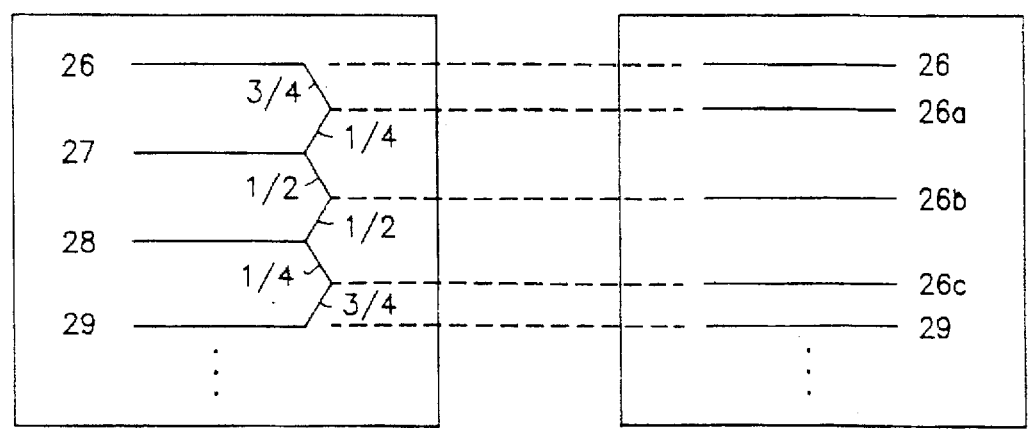
FIGS. 4A and 4B are views of scanning lines of FIG. 3 according to the present invention.
Figure 2:
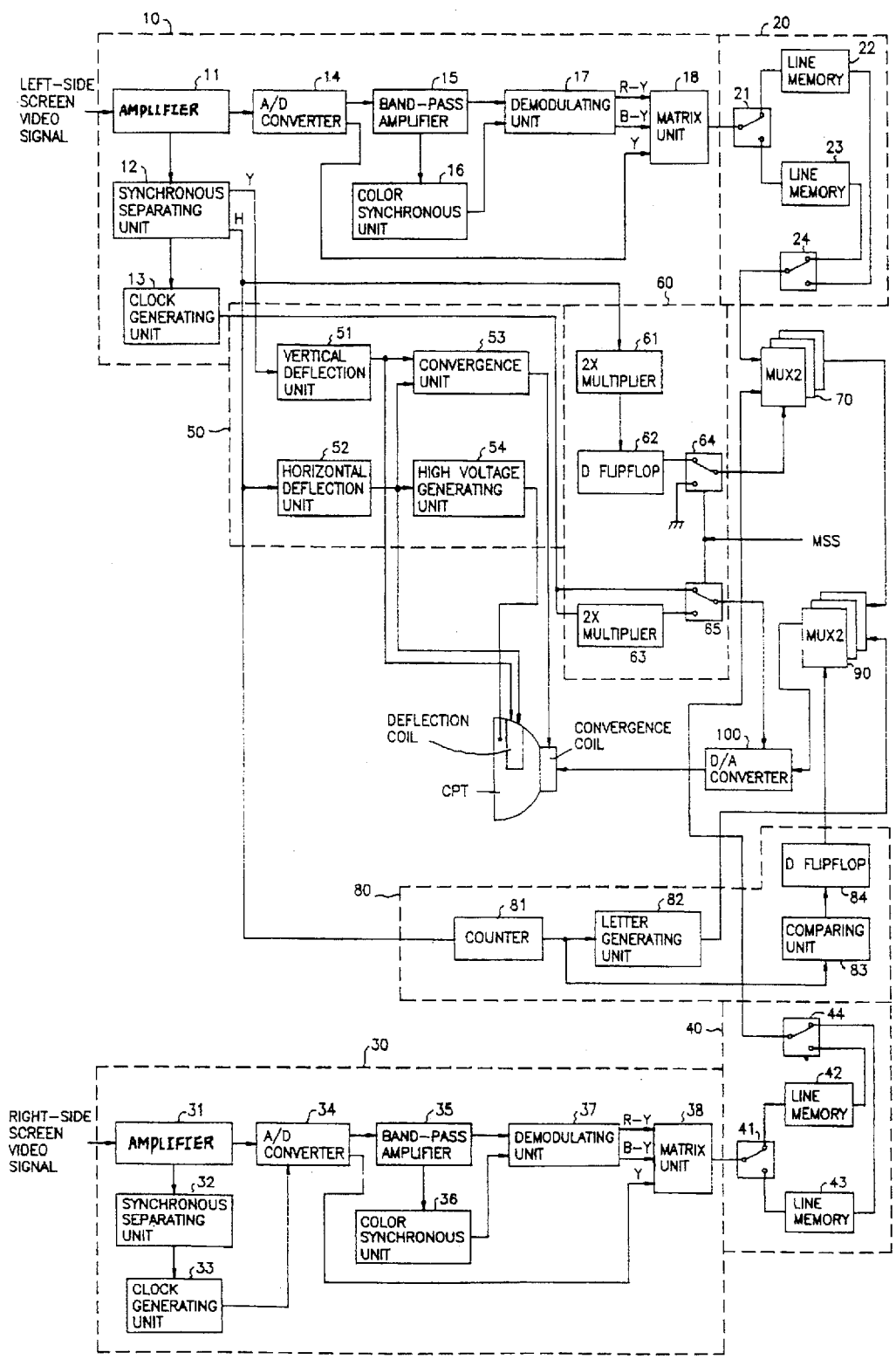
FIG. 2 is a block diagram of a double picture producing apparatus for a conventional wide screen television.

That is, when the first video signal one-line-delayed and outputted from the line memory 103 has scanning lines 26 through 29 as shown in FIG. 4A, since K is 1, ¼, ½, ¾ . . . , the coefficient value 1−K of the first operation unit 105 has the values of 0, ¾, ½, ¼ . . . , and the coefficient value K of the second operation unit 106 is 1, ¼, ½, ¾.

As a result, when the coefficient values 1−K and the scanning lines 26–28 are multiplied by the first and second operation units 105 and 106 and added by the adder 107, new scanning lines 26a, 26b, and 26c are generated by the upper and lower scanning lines as shown in FIG. 4B, and the new scanning lines 26a, 26b, and 26c are inserted between the first scanning 26 and the third scanning line 28.

Therefore, the scanning line is increased by one at every third scanning line outputted from the line memory 103, and the total number of the scanning lines is 525×(4/3) because the adder 107 outputs four scanning lines. The line memory 103 outputs the third scanning line, and the fourth scanning line is delayed until four scanning lines are all outputted from the adder 107, and the line memory 103 delays the fourth scanning line among the entire scanning lines by one line.

In addition, the second zooming unit 200 performs the same operation as the first zooming unit 100, aspect-ratio-converts the second video signal, and stores it to the field memory 400. The field memory 400 outputs a second video signal to the video signal selection unit 900 by synchronizing it with the first video signal in accordance with horizontal and vertical synchronous signals H and V outputted from the synchronous separating unit 300.

Therefore, when a user wants to watch a broadcasting program with a single picture, the video signal selection unit 900 receives a mode selection signal MSS of a single picture and selects a video signal outputted from the first zooming unit 100 or the second zooming unit 200, a first video signal or a second video signal which each is aspect-ratio-converted are displayed on the screen of the color picture tube.

Thereafter, when a mode selection signal MSS of a double picture so that a user watches a double picture is outputted from the video signal selection unit 900, the clock generating unit 501 of the clock generating unit 500 outputs a writing clock signal WTC of $910f_H$ in accordance with a horizontal synchronous signal H outputted from the synchronous separating unit 300, and the 2× multiplier 502 outputs a reading clock signal of $1820f_H$ by doubling the writing clock signal WTC of $910f_H$, and the tflipflop 503 outputs a reading/writing mode signal in accordance with a horizontal synchronous signal H outputted from the synchronous separating unit 300.

At this time, when a writing mode signal is outputted from the tflipflop 503, the line memories 701 and 702 write the first line of the first and second video signals outputted from the first zooming unit 100 and the field memory 400 in accordance with a writing clock signal WTC of $910f_H$ outputted from the clock generating unit.

Thereafter, when a reading mode signal is outputted from the tflipflop 503, the line memories 701 and 702 neglects a video signal of the second line and reads the first line of the first and second video signals at a speed which is two times a speed in the writing mode in accordance with a reading clock signal WTC of $1820f_H$ outputted from the 2× multiplier 502.

When the writing mode signal is inputted from the tflipflop 503, the third line of the first and second video signals are written, and when a reading mode signal is inputted, a video signal of the written third line is repeatedly read, so that the line memories 701 and 702 write only odd number lines of the first and second video signals.

Figure 5B:
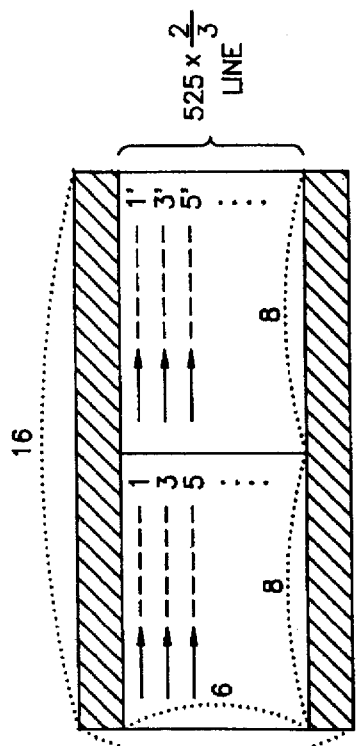
FIGS. 5A through 5D are schematic front views of a configuration of a double picture screen for a wide screen television according to the present invention.
Figure 5D:
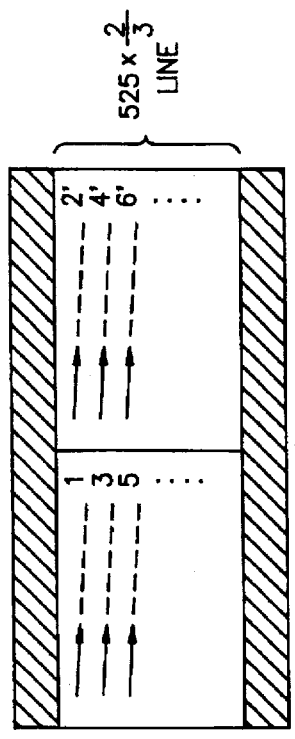
Figure 5A:
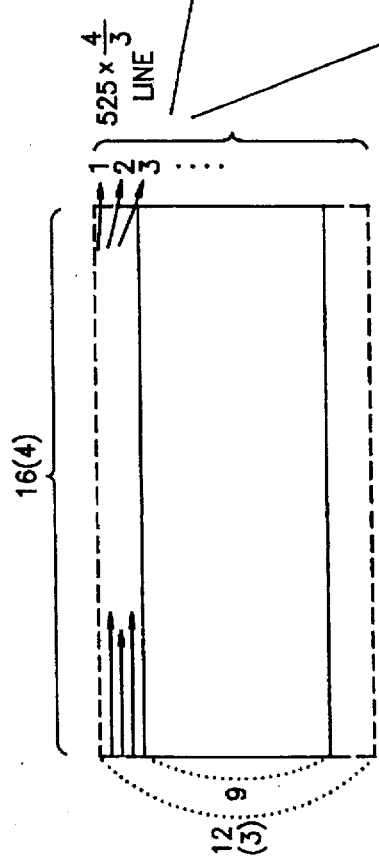
Figure 5C:
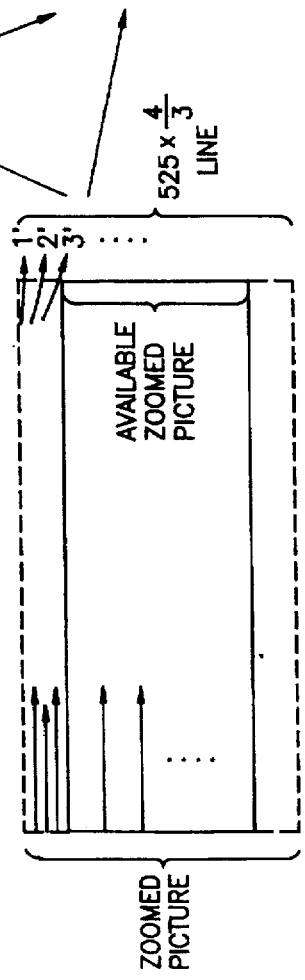

Therefore, since the line memories 701 and 702 write and read only odd number lines from the video signals, which are zoomed up, having the scanning lines of 525×(4/3) as shown in FIG. 5A and 5C, the total number of lines of the first and second video signals outputted from the line memories 701 and 702 is half the number of expanded scanning lines of 525×(4/3). That is, the number of the scanning lines is 525×(2/3). As a result, the number of scanning lines are converted at a ratio of 2:1.

At this time, the divider 703 divides the reading clock signal WTC of $1820f_H$ outputted from the 2× multiplier 502 by $901f_H$, and the tflipflop 704 outputs a clock signal having a high level and a low level for one horizontal scanning period in accordance with an output of the divider 803, and the switch 705 outputs a video signal outputted from the line memories 701 and 702 for one horizontal scanning period to the frame memory 806 in accordance with a clock signal outputted from the tflipflop 804.

In addition, the address counter 601 of the decimating unit 600 counts the writing clock signal WTC of $910f_H$ outputted from the writing clock generating unit 501 of the clock generating unit 500 and outputs a writing address, and the 2× multiplier 602 receives and doubles a writing address from the address counter 601, and the switch 603 receives a writing address and a reading address outputted from the address counter 601 and the 2× address generating unit 602 and selectively outputs to the frame memory 806 in accordance with a reading/writing mode signal outputted from the tflipflop 503 of the clock generating unit 500.

Therefore, the frame memory 707 writes a double picture video signal inputted thereto through the switch 805 in accordance with a writing address outputted from the address counter 601 in the writing mode, and produces letter boxes at upper and lower portion of the screen having 1.5 lines in accordance with a letter box control signal outputted from the scanning line counter 700 in the reading mode, and reads even and odd number pixels of a double picture video signal stored in accordance with a reading address outputted from the 2× multiplier 602.

At this time, since the frame memory 806 reads only even and odd number pixels from a video signal of a stored double picture, the number of pixels of a horizontal scanning line of the first video signal and the second video signal is 455 because each is half the number thereof. However, a shown in FIG. 5B, when a picture is formed with a double picture, and the first picture signal and the second picture are combined, and a normal horizontal scanning line of $910f_H$ is formed.

Thereafter, the video signal of a double picture outputted from the flume memory 707 is outputted through the switch 801 of the video signal selection unit 800 and convened into an analog signal by the D/A converter 802 and outputted to the color picture tube, so that a double picture is displayed on the screen of the color picture tube.

In addition, FIG. 6 shows a decimating unit and a double picture signal generating unit of a double picture generating apparatus for a wide-screen television of a second embodiment according to the present invention, which includes a decimating unit 900 which has an address counter 901 for counting the writing clock signal WTC of $910f_H$ outputted from the clock generating unit 501 of the clock generating unit 500 and for outputting a writing address, a 2× multiplier 902 for doubling the writing address and for outputting a reading address of $1820f_H$, and multiplexers 903 and 904 for receiving a writing address and a reading address from the address counter 901 and the 2× multiplier 902 and for outputting it in accordance with a reading/writing signal.

The double picture video signal generating unit 910 includes a tflipflop 911 for receiving a horizontal synchronous signal H and for outputting a selection signal, a tflipflop 912 for outputting a reading/writing signal in accordance with a selection signal of the tflipflop 911, a switch 913 which is alternately switched in accordance with a selection signal of the tflipflop 911 for outputting the first and second video signals between which the scanning line is inserted, a line memory 914 for reading/writing first and second video signals in accordance with a writing/reading address outputted from the multiplexer 903 in a state that the ling memory 914 is set in accordance with a reading/writing signal inverted by the inverter IN1, a line memory 915 for reading/writing first and second video signals in accordance with a reading/writing address outputted from the multiplexer 904 in a state that the line memory 915 is set in accordance with a reading/writing signal of the tflipflop 912, a 2× multiplier 916 for doubling the horizontal synchronous signal H, a tflipflop 917 for receiving the output of the 2× multiplier 916 and for outputting a clock signal having a high level and a low level for one horizontal scanning period, a multiplexer 918 for selectively outputting the first and second video signals outputted from the line memories 914 and 915 for one horizontal scanning period in accordance with a clock signal outputted from the tflipflop 917, a counter 919 for counting the horizontal synchronous signal H and for outputting a letter box control signal, and a frame memory 920 for outputting a video signal of a double picture in accordance with a writing address outputted from the address counter 901 and a letter box control signal outputted from the scanning line counter 706.

The operation of the double picture producing apparatus for a wide screen television of a second embodiment according to the present invention will now be explained with reference to the accompanying drawings.

To begin with, when a first video signal and a second video signal between which a scanning line is inserted are inputted to the video signal generating unit 910, the switch 913 is alternately switched in accordance with a selection signal outputted from the tflipflop 911, and odd or even numbers of the first video signal and the second video signal at every horizontal scanning period are applied to the line memories 914 and 915, respectively.

In this case, when the first video signal is applied to the line memory 914, and when the line memory 914 is in a writing state in accordance with a reading/writing signal outputted from the tflipflop 912, the line memory 915 becomes a reading state, and the first line of the first video signal is stored in accordance with a writing address outputted from the multiplexer 903.

At this time, the multiplexer 904 outputs a writing address in accordance with a reading/writing signal outputted from the tflipflop 912, and the multiplexer 905 outputs a reading address.

Thereafter, when the second video signal is applied to the line memory 915, and when the line memory 914 becomes a reading state in accordance with a reading/writing signal outputted from the tflipflop 912, the line memory 915 becomes a writing state, and the first line of the first video signal written in the line memory 914 is read at a 2× speed in accordance with a reading address of 1820$f_H$ outputted from the multiplexer 903, and the line memory 915 writes the second line of the second video signal in accordance with a writing address of 910$f_H$ outputted from the multiplexer 903. At this time, the line memories 914 and 915 read and write in accordance with a writing address of 910$f_H$.

Odd number lines 1, 3, 5, . . . , (n+1) of the first video signal are read from/written on the line memory 914, and even number lines 2, 4, 6, . . . , (n+2) are read from/written on the line memory 915.

Therefore, the line memories 914 and 015, as shown in FIGS. 5A and 5C, write only odd and even number lines among the first and second video signals having a scanning lines 525×(4/3) of a video signal, and the total number of scanning lines of the first and second video signals becomes half the number of scanning lines 525×(4/3) of the expanded video signal, and the number of scanning lines becomes 525×(2/3), so that the number of scanning lines can be converted at half the number thereof.

In addition, since the first video signal in which odd number of lines are written and the second video signal in which even number of lines are written read only odd number or even number of pixels in accordance with a reading address of 1820$f_H$ which is doubled, the number of pixels of the horizontal scanning lines of the first video signal and the second video signal become 455.

Thereafter, the multiplexer receives a clock signal having a high level and a low level from the tflipflop 917 for one horizontal scanning period, and select odd number of lines 1, 3, 5, . . . (n+1) of the first video signal outputted from the line memory 914 and even number of lines 2, 4, 6, . . . , (n+2) for one horizontal scanning period and outputs to the frame memory 920.

Therefore, the frame memory 920 writes first and second video signals outputted from the multiplexer 918 in accordance with a writing address of 910$f_H$ outputted from the address counter 601 for producing a double picture, and the first video signal and the second video signal are combined which each has 455 pixels of the horizontal scanning line as shown in FIG. 5D, and there are produced a horizontal scanning line of 910$f_H$.

At this time, the first video signals are referred to odd number of lines 1, 3, 5, . . . , (n+1) and the second video signals are referred to even number of lines 2, 4, 6, . . . , (n+2). Here, the odd and even numbers of lines are crossingly inserted into each other by one horizontal line.

As described above, the double picture producing apparatus for a wide screen television according to the present invention is directed to concurrently achieving an aspect ratio conversion and a double picture display using a picture zooming up function of an aspect ratio conversion, so that the construction of the system can be simple and manufacturing cost of the system can be reduced.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A double picture producing apparatus for a wide screen television, comprising:

a first-zooming unit for line-delaying a first video signal, and for increasing the number of scanning lines through an operation, and for performing an aspect ratio conversion function;

a second zooming unit for line-delaying a second video signal, and for increasing the number of scanning lines through an operation, and for performing an aspect ratio conversion function;

a synchronous separating unit for receiving a first video signal, and for separating a horizontal synchronous signal and a vertical synchronous signal from said first video signal;

a first field memory for receiving an output of second zooming unit having a converted aspect ratio and for synchronizing said output with said horizontal synchronous signal and said vertical synchronous signal;

a clock generating unit for receiving said horizontal synchronous signal and for outputting a writing clock signal, a reading clock signal, and a mode selection signal;

a decimating unit for counting the writing clock signal outputted from said clock generating unit and for outputting a writing address and a reading address in accordance with said mode selection signal;

a double picture video signal generating unit for receiving said first video signal and said second video signal which are aspect-ratio-converted by the first and second zooming units and for outputting a video signal of a double picture by dividing the number of scanning lines of the video signals in half; and a video signal selection unit for receiving first and second video signals aspect-ratio-converted by the first and second zooming units and a double picture video signal outputted from said double picture video signal generating unit, and for outputting the signals to a color picture tube in accordance with said mode selection signal.

2. The apparatus of claim 1, wherein said first and second zooming units include:

an A/D converter for converting first and second video signals into a digital signal;

a second field memory for synchronizing the output of said AID converter with a horizontal synchronous signal;

a first line memory for delaying the output of said second field memory by one line;

a second line memory for delaying the first video signal, which is one-line-delayed, by one line;

first and second operation units for operating the outputs of said first and second line memories and for varying a line value; and an adder for adding the line values of said first and second operators, and for inserting a new scanning line, and for outputting first and second video signals which are aspect-ratio-converted.

3. The apparatus of claim 2, wherein said first and second zooming units are directed to inserting three scanning lines between the first scanning and the third scanning line at every three scanning lines through an operation of upper and lower scanning lines and to generating four scanning lines.

4. The apparatus of claim 1, wherein said clock generating unit includes a clock generating unit for outputting a writing clock signal of $910f_H$ in accordance with a horizontal synchronous signal outputted from the synchronous separating unit;

a first 2× multiplier for doubling the writing clock signal of $910f_H$ and for outputting a reading clock signal of $1820f_H$; and a first t-flip-flop for outputting a reading/writing signal in accordance with a horizontal synchronous signal outputted from the synchronous separating unit.

5. The apparatus of claim 1, wherein said decimating unit includes:

an address counter for counting the writing clock signal of $910f_H$ outputted from the clock generating unit and for outputting a writing address;

a second 2× multiplier for doubling the writing address outputted from said address counter; and a first switch, which is switched in accordance with a reading/writing mode signal outputted from said t-flip-flop, for selectively outputting a writing address outputted from the address counter and a reading address outputted from said second 2× multiplier.

6. The apparatus of claim 1, wherein said double picture video signal generating unit includes:

third and fourth line memories for writing first and second video signals outputted from the first and second zooming units as a writing clock signal of $910f_H$ and for reading an odd number of first and second video signals as a reading clock signal of $1820f_H$ in accordance with a reading/writing mode signal outputted from said first t-flip-flop;

a divider for receiving a reading clock signal of $1820f_H$ outputted from the first 2× multiplier and for dividing the signals by $910f_H$;

a second t-flip-flop for outputting a clock signal having a high level and a low level for one horizontal scanning period in accordance with an output of said divider;

a second switch, which is alternately switched in accordance with a dock signal outputted from said second t-flip-flop, for outputting first and second video signals read by said third and fourth line memories;

a scanning line counter for counting a horizontal synchronous signal and for outputting a letter box control signal; and a frame memory for storing a video signal outputted from said second switch as a video signal of a double picture in accordance with a writing address of an address counter, and for reading the stored video signal of a double picture in accordance with a letter box control signal outputted from the scanning line counter and a reading address outputted from the 2× multiplier, and for outputting a video signal of a double picture.

7. The apparatus of claim 1, wherein said video signal selection unit includes:

a third switch for receiving first and second video signals outputted from the first and second zooming units and a double picture video signal outputted from the double picture video signal generating unit and for outputting a certain signal in accordance with a mode selection signal; and a D/A converter for converting a video signal selected by said third switch into an analog video signal.

8. The apparatus of claim 1, wherein said decimating unit includes:

an address counter for counting a writing clock signal of $910f_H$ outputted from the clock generating unit of the clock generating unit and for outputting a writing address;

a 2× multiplier for doubling the writing address and for outputting a reading address of $1820f_H$; and first and second multiplexers for receiving a writing address and a reading address outputted from said address counter and said 2× multiplier, respectively, and for outputting a certain signal in accordance with a reading/writing signal.

9. The apparatus of claim 1, wherein said double picture video signal generating unit includes:

a third t-flip-flop for receiving a horizontal synchronous signal and for outputting a selection signal;

a fourth t-flip-flop for outputting a reading/writing signal in accordance with a selection signal of said third t-flip-flop;

a fourth switch, which is alternately switched in accordance with a selection signal of said third t-flip-flop and for outputting first and second video signals between said scanning line is inserted;

a fifth line memory for writing/reading first and second video signals in accordance with a writing/reading address outputted from said first multiplexer wherein the reading/writing signal inverted by an inverter is set;

a sixth line memory for reading/writing first and second video signals in accordance with a reading/writing address outputted from said second multiplexer and which is set in accordance with a reading/writing signal of said fourth t-flip-flop;

a third 2× multiplier for doubling a horizontal synchronous signal;

a fifth t-flip-flop for receiving an output of said third 2× multiplier and for outputting a clock signal having a high level and a low level for one horizontal scanning period;

a third multiplexer for selectively outputting first and second video signals outputted from said fifth and sixth line memories for one horizontal scanning period in accordance with a clock signal outputted from said fifth t-flip-flop;

a scanning counter for counting a horizontal synchronous signal and for outputting a letter box control signal; and a frame memory for outputting a video signal of a double picture in accordance with a writing address outputted from the address counter and a letter box control signal outputted from the scanning line counter.

* * * * *